United States Patent
Miyamae

(10) Patent No.: US 7,103,249 B2
(45) Date of Patent: Sep. 5, 2006

(54) OPTICAL MODULE AND MANUFACTURING METHOD OF THE SAME, OPTICAL-COMMUNICATION APPARATUS, AND ELECTRONIC APPARATUS

(75) Inventor: Akira Miyamae, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 280 days.

(21) Appl. No.: 10/843,480

(22) Filed: May 12, 2004

(65) Prior Publication Data

US 2005/0025435 A1 Feb. 3, 2005

(30) Foreign Application Priority Data

May 14, 2003 (JP) ............................. 2003-135635

(51) Int. Cl.
*G02B 6/30* (2006.01)
*H04J 14/02* (2006.01)
*H01L 21/00* (2006.01)

(52) U.S. Cl. ........................... 385/49; 385/14; 385/52; 385/53; 385/88; 385/92; 385/129; 385/131; 398/82; 398/85; 438/29; 438/31

(58) Field of Classification Search .................. 385/14, 385/49, 52, 88, 89, 92, 140, 53, 73, 75, 130, 385/131; 398/82, 83, 85; 438/29, 30, 31, 438/32

See application file for complete search history.

(56) References Cited

U.S. PATENT DOCUMENTS

| | | | | |
|---|---|---|---|---|
| 3,553,467 A * | 1/1971 | Ramsey | ..................... | 250/233 |
| 4,217,598 A | 8/1980 | d'Auria et al. | ................ | 357/19 |
| 5,768,456 A | 6/1998 | Knapp et al. | ................. | 385/49 |
| 6,327,407 B1 * | 12/2001 | Mitsuda et al. | ............... | 385/49 |
| 6,364,538 B1 * | 4/2002 | Ishiharada et al. | ............ | 385/78 |
| 6,548,880 B1 * | 4/2003 | Hirasawa | ..................... | 257/433 |
| 6,563,876 B1 * | 5/2003 | Boyce et al. | .......... | 375/240.15 |
| 6,848,841 B1 * | 2/2005 | Cochran et al. | ............ | 385/88 |
| 6,915,049 B1 * | 7/2005 | Murata | ....................... | 385/52 |
| 2002/0118924 A1 | 8/2002 | Murata | ....................... | 385/52 |
| 2004/0136725 A1 | 7/2004 | Miyamae et al. | .......... | 398/164 |
| 2004/0223703 A1 | 11/2004 | Miyamae et al. | ............ | 385/88 |

FOREIGN PATENT DOCUMENTS

| | | | | |
|---|---|---|---|---|
| JP | 2-9183 | 1/1990 | ............... | 385/14 X |
| JP | 6-275870 A | 9/1994 | ............... | 385/14 X |
| JP | 2000-501239 A | 2/2000 | ............... | 385/14 X |
| JP | 2001-290056 A | 10/2001 | ............... | 385/14 X |
| JP | 2002-174744 A | 6/2002 | ............... | 385/14 X |
| JP | A 2002-250846 | 9/2002 | ............... | 385/92 X |
| JP | 2002-359426 A | 12/2002 | ............... | 385/14 X |
| JP | 2003-503858 A | 1/2003 | ............... | 385/14 X |
| JP | A 2004-031508 | 1/2004 | ............... | 385/92 X |
| WO | WO 97/20344 | 6/1997 | ............... | 385/14 X |
| WO | WO 98/29772 | 7/1998 | ............... | 385/92 X |

(Continued)

*Primary Examiner*—Brian M. Healy
(74) *Attorney, Agent, or Firm*—Oliff & Berridge, PLC

(57) ABSTRACT

The invention provides an optical module that enables to increase the optical coupling efficiency without being dependent on the thickness of a substrate. The optical module, detachably coupled to a connector provided at one end side of an optical fiber, can include a substrate having a first hole, a translucent layer arranged so as to cover, at least, the first hole on one surface side of the substrate, and an optical element that is arranged inside the first hole and on the translucent layer and carries out transmission or reception of light signal to/from the optical fiber through the translucent layer.

26 Claims, 3 Drawing Sheets

FOREIGN PATENT DOCUMENTS

WO  WO 01/01497 A1  1/2001

WO  WO 02/31565 A1  4/2002  ............... 385/92 X

\* cited by examiner

OPTICAL MODULE AND MANUFACTURING METHOD OF THE SAME, OPTICAL-COMMUNICATION APPARATUS, AND ELECTRONIC APPARATUS

BACKGROUND OF THE INVENTION

1. Field of Invention

The present invention relates to an optical module suitably used for an optical transmission system and a manufacturing method of the same.

2. Description of Related Art

In an optical transmission system, the basic configuration is the one coupling a light emitting element, which converts electrical signal into light signal, and a light receiving element, which converts light signal into electrical signal, through an optical fiber. In order to make an optical element, such as the above light emitting element and light receiving element, and an optical fiber detachable, an optical module is used for optically coupling an optical element and an optical fiber. Such an optical module is described, for example, in reference documents including the following document (Japanese laid-open patent publication No. 14-250846).

SUMMARY OF THE INVENTION

Because the above-described conventional optical module is constituted by arranging an optical element on one surface side of a substrate and an optical fiber on the other surface side of the substrate, the mutual distance of the optical element and the optical fiber is dependent on the thickness of the substrate. For this reason, in order to increase optical coupling efficiency between the optical element and the optical fiber, the distance therebetween should be shortened by forming the substrate relatively thin. However, if the substrate is made thin, there can be an inconvenience in that securing its mechanical strength becomes difficult. And moreover, deformation such as bending is likely to happen in the substrate. Therefore, there is an inconvenience in that securing a position of the optical element and the optical fiber precisely becomes difficult.

Moreover, because the optical module described in the above document is constituted providing an opening in a substrate and transmitting/receiving light signal between an optical element and an optical fiber through the opening, protecting the light emitting surface or the light receiving surface of the optical element, arranged inside the opening, becomes difficult. Although a method of sealing the optical element, for example, by using translucent resin or the like, can be taken to this problem, such a method is hard to increase the sealing performance of the optical element.

An object of the invention is to provide an optical module that enables to increase the optical coupling efficiency without being dependent on the thickness of a substrate. Moreover, another object of the invention is to provide an optical module that enables to increase the protection performance of a light emitting surface or a light receiving surface of an optical element.

An optical module according to a first embodiment of the invention is the optical module, detachably coupled to a connector provided at one end side of an optical fiber, and includes a substrate having a first hole that is used to secure a space for arranging an element, a translucent layer that is arranged so as to cover, at least, the first hole on one surface side of the substrate, and an optical element that is arranged inside the first hole and on the translucent layer, and carries out transmission or reception of light signal to/from the optical fiber through the translucent layer.

The mutual distance of the optical element and the optical fiber is not dependent on the thickness of the substrate by employing a structure where the optical element is arranged in the space secured by the first hole and the optical element is supported by the translucent layer that is arranged so as to cover the first hole. Accordingly, the optical coupling efficiency can be increased without being dependent on the thickness of the substrate. Moreover, because the translucent layer is interposed between the optical element and the optical fiber, the protection performance of the light emitting surface or the light receiving surface of the optical element will be increased easily.

The translucent layer means a layer of translucence that allows light signal to pass therethrough, and any material can be employed as long as it has a moderate mechanical strength sufficient for supporting the optical element. However, a resin layer (translucent resin layer) such as polyimide and epoxy resin that allows light to pass therethrough can be preferably used.

Preferably, the above-described first hole can be formed so as to penetrate the substrate. Accordingly, mounting the optical element and other processings (for example, sealing the periphery of the optical element) can be carried out from the opening of the first hole, which is not covered with the translucent layer, when manufacturing the optical module, and this is convenient for the manufacturing process. Moreover, because the top surface (the surface side, which is not in contact with the translucent layer) of the optical element is made open, a heat dissipation measure of the optical element can be carried out easily.

More preferably, the substrate can include a second hole therein, which is used for aligning when mounting the above-described connector for supporting the optical fiber to the optical module. More specifically, at least two or more second holes are preferably provided. In this case, by using the connector which includes a pin (protruding portion) used for aligning, the connector can be mounted to the optical module such that the pin is inserted in the second hole. Accordingly, the connector can be mounted to the optical module more easily and with sufficient precision.

Moreover, it is preferable to further include adjustment material (underfill material) that is interposed between the translucent layer and the optical elements and suppresses scattering of the light signal. Accordingly, interfacial reflection is suppressed and the optical coupling efficiency is improved.

It is preferable to further include sealing material to seal the optical element. Accordingly, the sealing performance of the optical element can be improved. Moreover, the protection performance of the portion, which is not in contact with the translucent layer of the optical element, can be improved.

It can also be preferable that the above-described sealing material and adjustment material are made of a same material. Accordingly, the adhesion of the adjustment material and the sealing material is improved. Moreover, the simplification of the manufacturing process can be attained by simultaneously forming the adjustment material and the sealing material.

It is also preferable that the above-described translucent layer is constituted using a translucent flexible printed circuit board having a wiring layer at least on one surface side or on both surface sides. Accordingly, wiring required for the signal transmission to the optical element can be also formed when forming the translucent layer, thereby the simplification of the structure and the simplification of the manufacture process can be attained.

Moreover, as for the above-described flexible printed circuit board, it is further preferable to use the one including a microstrip line. Accordingly, transmission loss in high frequency region can be reduced and an optical module suitable for high-speed driving of an optical element can be provided.

It can be preferable to further include an electronic component, which is arranged on the other surface side of the substrate and constitutes an electric circuit together with the optical element. The electronic component refers to a driver for driving a light emitting element of the optical element, an amplifier for amplifying the output signal of a light receiving element of the optical element, other various kinds of circuit chips, passive elements such as a resistor and a capacitor, or other various kinds of active elements and passive elements. Thus, by providing various kinds of electronic components related to the operation of the optical element, an externally attached driving circuit or the like can be omitted or simplified. Moreover, because the wire length between circuit chips such as a driver and an optical element is shortened, an effect that easily avoids inconvenience such as signal delay or noise interference can be also expected.

Moreover, it is preferable that the above-described electronic component is electrically coupled to the wiring layer of the flexible printed circuit board through the conductor arranged so as to penetrate the substrate. By using such embedded type wiring (so called, a plug), further miniaturization of the optical module can be attained.

It can also be preferable that electronic components (circuit chips, in particular) are arranged on the other surface side of the substrate and above the optical element. By employing such a so-called three-dimensional mounting, high integration is attained and miniaturization of an optical module can be achieved.

An optical module according to a second embodiment of the invention can include a substrate having a hole used for securing a space for arranging an element, and a translucent layer arranged at least on one surface side of the substrate so as to cover the hole, an optical element arranged inside the hole and on the translucent layer and carries out transmission or reception of light signal through the translucent layer, and an optical waveguide arranged on one surface side of the substrate and allows light signal, which is to be transmitted or received by the optical element, to pass therethrough. With such a structure, the mutual distance of the optical element and the optical waveguide is not dependent on the thickness of the substrate by employing a structure where the optical element is arranged in the space secured by the hole and the optical element is supported by the translucent layer arranged so as to cover the hole. Accordingly, the optical coupling efficiency can be increased without being dependent on the thickness of the substrate. Moreover, because the translucent layer is interposed between the optical element and the optical waveguide, protection performance of the light emitting surface or the light receiving surface of the optical element can be increased easily.

As long as the optical waveguide can transmit light signal toward a desired direction, the structure thereof will not be limited. For example, the one having a core/clad structure using two media that have different refractive indexes as in an optical fiber or the like, and the one using a photonic crystal or the like can be conceivable. Moreover, as for the optical waveguide, it is preferable to employ the one arranged such that its extension direction is substantially in parallel with one surface side of the substrate (a plane type optical waveguide).

Moreover, it is preferable that the translucent layer consists of a flexible translucent printed circuit board having a wiring layer at least on one surface side, and further includes a bump, which is arranged on the other surface side of the substrate of the flexible printed circuit board and has a function of electrical coupling to the outside. Accordingly, the mutual electrical coupling to an external circuit board or the like is secured more easily.

In addition, more preferable conditions of the optical module according to the second embodiment is basically the same as the case of the above-described optical module according to the first embodiment. Although its detailed description is omitted here, the same conditions concerning the hole, the translucent layer, the adjustment material, the sealing material, the electronic component or the like can be employed.

Moreover, the invention also relates to an optical communication apparatus (optical transceiver), which can include the above-described optical module. The optical communication apparatus according to the present invention can be used for various kinds of electronic apparatuses, which carries out information communication to/from an external apparatus such as a personal computer and so-called PDA (personal digital assistant) by using light as the transmission medium. In this specification, the optical communication apparatus refers to not only the apparatus including both structures related to the transmission of signal light (a light emitting element or the like) and related to the reception of signal light (a light receiving element or the like), but also the apparatus including only one structure related to the transmission (so-called light sending module) or related to the reception (so-called light reception module).

Moreover, the invention also relates to an electronic apparatus, which includes the above-described optical module. More specifically, an electronic apparatus according to the present invention includes a case where the above-described optical communication apparatus having the optical module is provided, in addition to a case where the above-described optical module itself is provided. In this specification, the electronic apparatus refers to an apparatus in general which realizes a certain function using an electronic circuit or the like, and its structure is not specifically limited, and various kinds of apparatuses such as a personal computer, a PDA (personal digital assistant), and an electronic notebook, can be cited.

Moreover, the invention is a method of manufacturing an optical module that includes forming a hole in the substrate, forming a translucent layer so as to cover, at least, the hole on one surface side of the substrate, and forming an optical element, which carries out transmission or reception of light signal, inside the hole and on the translucent layer. By such a manufacturing method, the above-described optical module according to the present invention can be manufactured.

Moreover, a plurality of optical modules can be simultaneously formed by carrying out the above-described manufacturing method in parallel in a plurality of portions on one substrate. Specifically, a method of manufacturing an optical module according to the invention can include forming a plurality of first holes in a substrate, forming a translucent layer on one surface side of the substrate so as to cover at least each first hole, forming an optical element, which carries out transmission or reception of light signal, inside each of the holes and on the translucent layer, and dividing the substrate for each predetermined region corresponding to each of the first holes. By such a manufacturing method, the above-described optical module according to the present invention can be manufactured. Moreover, according to this manufacturing method, because most of the optical module assembly processes can be batch processed on one substrate, an inexpensive optical module with a good yield can be manufactured in high volume.

It is preferable to further include forming a wiring layer having a function to transmit signal to each optical element, at least, on one surface side of the translucent layer.

Moreover, it is preferable that the forming the translucent layer and the forming the wiring layer are carried out simultaneously by attaching a flexible printed circuit board including the translucent layer and the wiring layer to one surface side of the substrate. Specifically, it is preferable that the flexible printed circuit board constitutes a microstrip line. Accordingly, the simplification of the manufacture process can be attained.

Moreover, it is preferable to further include forming an adjustment material, which suppresses scattering of light signal, between the translucent layer and the optical element.

It can be preferable to further include forming a sealing material so as to cover each of the optical elements.

Moreover, when the optical module, related to the manufacturing method according to the present invention, is detachably coupled to a connector provided at one end side of an optical fiber, it is preferable to further include forming a second hole that is used for aligning when arranging the connector on one surface side of the substrate.

It can also be preferable to further include forming an electronic component constituting an electric circuit together with the optical element, by corresponding it to each of the optical elements, on the other surface side of the substrate.

Moreover, it is also preferable to further include forming a bump, which has a function of electrical coupling to the outside, on the other surface side of the board of the flexible printed circuit board.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, preferred embodiments of the invention will be described with reference to the accompanying drawings.

Figure 1A:
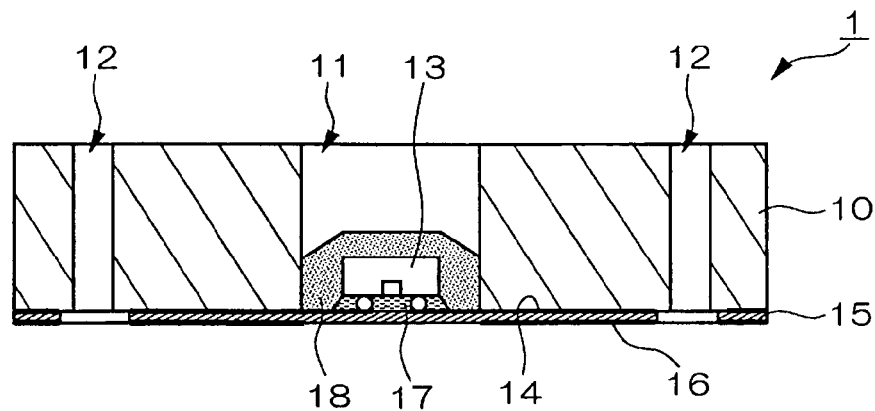
FIG. 1 is a view explaining a structure of an optical module according to a first embodiment.
Figure 1B:
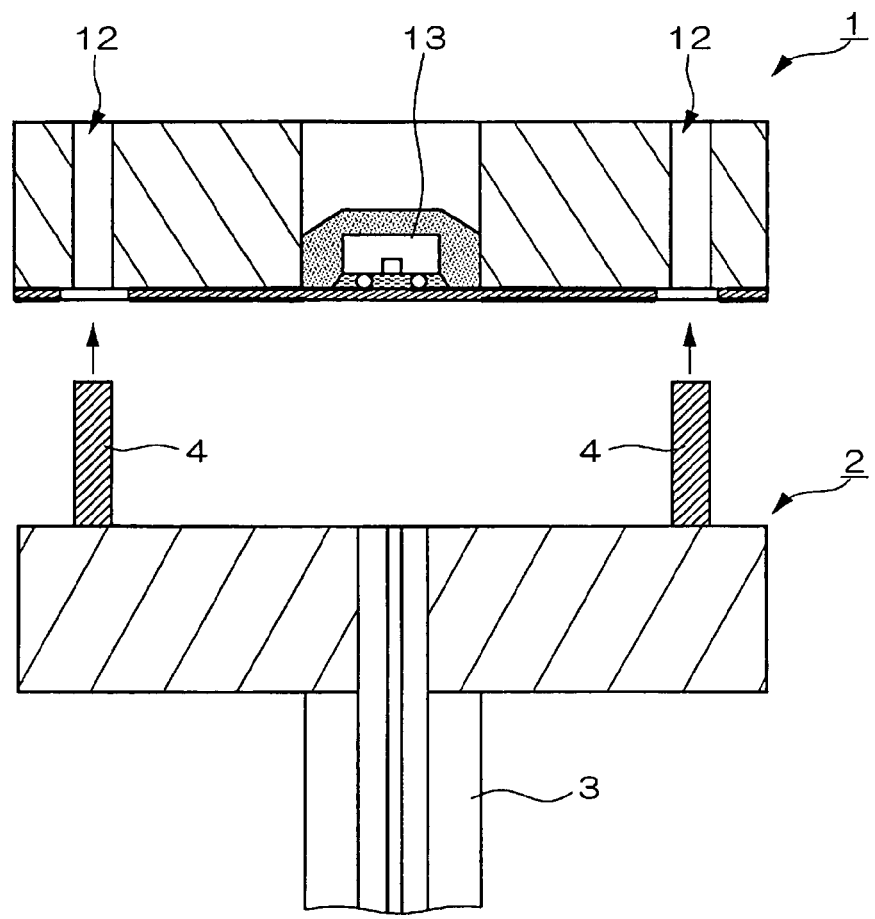

FIG. 1 is a view explaining a structure of an optical module according to one embodiment. The sectional view of the optical module according to the embodiment is shown in this figure. As shown in FIG. 1(a), the optical module 1 comprises: a substrate 10; an optical element 13; a first wiring layer 14; a translucent layer 15; a second wiring layer 16; underfill material 17; and sealing material 18. As shown in FIG. 1(b), the optical module 1 is detachably coupled to a connector 2 provided at one end side of an optical fiber 3.

The substrate 10 supports each element, which constitutes the optical module 1 including a first hole 11 provided substantially in the center of the substrate 10, and a second hole 12 provided near each end of the substrate 10. The substrate 10 can be constituted using various kinds of material such as conductive material of stainless steel, aluminum and copper or the like, and non-conductive material of glass, resin and ceramics or the like. For example, the substrate 10 is constituted by using ceramics for the embodiment.

The first hole 11 is used to secure a space (a space for arranging a element) for arranging the optical element 13. As illustrated, the optical element 13 is supported by the translucent layer 15 while being arranged inside the first hole 11. Accordingly, the mutual distance of the optical fiber 3 and the optical element 13 can be shortened while the thickness of the substrate 10 is necessarily and sufficiently secured. In addition, in the illustrated example, the first hole 11 penetrates from the one surface side of the substrate 10 to the other side surface, however, the hole is not necessarily a penetrating hole, but may be of a concavity. If the first hole 11 is formed as the penetrating hole as illustrated, it is convenient in the manufacturing process as its detail will be described later.

The second hole 12 is used for aligning the connector 2. Specifically, the connector 2 is provided with a reference pin 4 corresponding to the second hole 12 as illustrated, and the optical module 1 and the connector 2 is fitted in by inserting the reference pin 4 into the second hole 12. Accordingly, the optical fiber 3 and the optical element 13 are aligned easily and with high precision. In addition, in the illustrated example, the second hole 12 penetrates from one surface side of the substrate 10 to the other side surface, however, the hole is not necessarily a penetrating hole, but may be of a concavity.

The optical element 13, supported by the translucent layer 15 while being arranged inside the first hole 11, sends signal light (emits light) towards the optical fiber 3 through the translucent layer 15, or receives light signal (detects light) radiated from the optical fiber 3. For example, when the optical module 1 is used at the information transmission side, a light emitting element such as a VCSEL (Surface Emitting Laser) is used as the optical element 13. Moreover, when the optical module 1 is used at the information receiving side, a light receiving element, such as a photodiode and a photo transistor is used as the optical element 13.

The first wiring layer 14 has a function to transmit signal between the optical element 13 and an electronic component such as a circuit chip (not shown), and is arranged between the one surface side of the substrate 10 and the translucent layer 15. The first wiring layer 14 is formed in a predetermined shape (a wiring pattern) using a conductor, such as copper.

The translucent layer 15 is arranged on the one surface side of the substrate 10 so as to cover, at least, the entire first hole 11. According to the embodiment, the translucent layer 15 is formed substantially on the entire one surface side of the substrate 10 so as to cover the first wiring layer 14 also, but the translucent layer 15 is not formed at a region corresponding to the second hole 12. The optical fiber 3 and the optical element 13 are optically coupled through the translucent layer 15. The translucent layer 15 can be formed using a resin layer (translucent resin layer) that allows light to pass therethrough, such as polyimide and epoxy resin. A polyimide layer is suitably employed, because it has good translucent characteristic and flexibility and is easy to handle.

The second wiring layer 16 has a function to transmit signal between the optical element 13 and an electronic component, such as a circuit chip (not shown), and is formed on the translucent layer 15 in a predetermined shape (a wiring pattern) using a conductor such as copper.

In addition, in order to respond to high-speed operation of the optical element 13, it is preferable to constitute a microstrip line, which is suitable for transmitting high frequency signal, by including the first wiring layer 14, the translucent-layer 15 and the second wiring layer 16. The details for this case will be described later.

The underfill material (adjustment material) 17 is interposed between the optical element 13 and the translucent layer 15, and has a function to suppress reflection and scattering of light signal on the surface of the translucent layer 15, and reduces optical loss. Accordingly, interfacial reflection is suppressed and optical coupling efficiency is improved. As for the underfill material 17, the one having a refractive index close to (more preferably, substantially equal to) that of materials that constitute the resin layer 15 is used. As for the manufacturing process, it is preferable that the underfill material 17 is formed using material cured by a post-processing after having filled, such as thermosetting or optically-cured epoxy resin.

The sealing material 18 is for protecting the optical element 13 and is formed so as to seal the entire optical element 13 inside the first hole 11 and on the translucent layer 15. It is preferable that the sealing material (potting material) 18 is formed using material cured by post processing after having filled such as thermosetting or optically-cured epoxy resin. Moreover, it is also suitable that the sealing material 18 is formed by the same material as the above-described underfill material 17. Accordingly, the adhesion of the underfill material 17 and the sealing material 18 is improved. Moreover, in this case, the underfill material 17 and the sealing material 18 can be simultaneously formed.

Next, a case where the microstrip line is constituted including the first wiring layer 14, the translucent-layer 15 and the second wiring layer 16 will be described in detail. When constituting the microstrip line in this way, its characteristic impedance can be set to a desired value based on the following formula. That is, the characteristic impedance $Z0(\Omega)$ of the microstrip line is determined by the following formula, when the line width of the transmission line (the first wiring layer 14) is expressed as B, the line thickness as C, the gap between the transmission line and the ground (the second wiring layer 16 for the ground potential) as H, and the relative dielectric constant of the dielectric layer (translucent layer 15) as $\epsilon r$.

$$Z0 = (87/(\epsilon r+1.41)^{1/2}) \times \ln(5.98H/(0.8B+C))$$

When the input/output impedance of the optical element 13 is 50 Ω, signal attenuation can be prevented by attaining the impedance matching by setting the characteristic impedance of the microstrip line to 50 Ω. For example, the characteristic impedance Z0 of the microstrip line can be set to about 50 Ω by using a polyimide layer with its relative-dielectric-constant $\epsilon r=3.4$ for the translucent layer 15, and by setting B=0.09 mm, H=0.05 mm, and C=0.012 mm. And the thickness of the translucent layer 15 becomes 0.05 mm. If the thickness is thinner than this value, the conductor width becomes narrow and there may be a case where the DC resistance component is increased or the variance of impedance value is increased due to the variance of the line width.

The optical module 1 according to the embodiment has such a structure, and a manufacturing method thereof will be described next.

FIG. 2 is a view explaining a manufacturing method of an optical module according to the embodiment. According to the embodiment, a plurality of optical modules 1 are batch formed on one mother substrate, and the each optical module 1 is obtained by dividing the substrate later. Details will be described hereinafter.

Figure 2A:
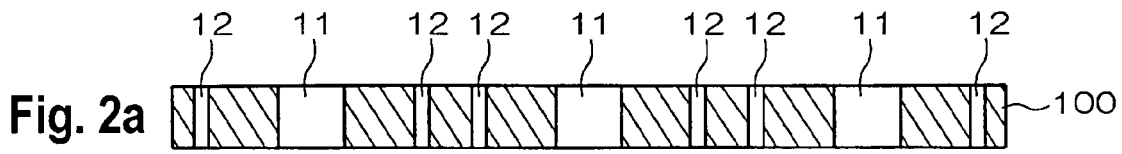
FIG. 2 is a view explaining a method of manufacturing the optical module according to the first embodiment.

First, as shown in FIG. 2(a), a mother substrate 100, which is to become a base material for the substrate 10 of the each optical module 1, is prepared. Then, corresponding to each formation region of the each optical module 1, a plurality of first holes 11 and a plurality of second holes 12 are formed in the mother substrate 100.

Figure 2B:
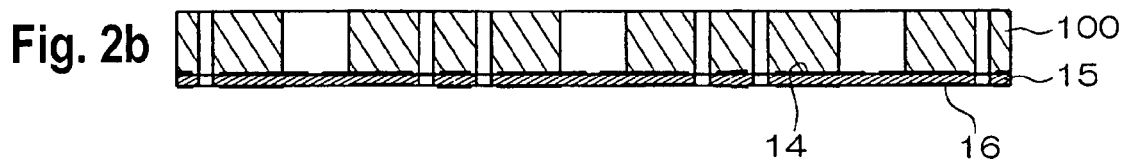

Next, as shown in FIG. 2(b), on one surface (bottom surface) of the mother substrate 100, the first wiring layer 14, the translucent layer 15, and the second wiring layer 16 are formed. It is preferable that this step is carried out by attaching a flexible printed circuit (FPC) board, which includes a plurality of wiring patterns corresponding to each of the plurality of optical modules 1, to one surface of the mother substrate 100. Moreover, it is preferable that the attachment of the flexible printed circuit board is carried out by inserting thermosetting adhesive sheet between the mother substrate 100 and the flexible printed circuit board, and by subsequent thermo-compression bonding. In this case, a strong adhesive strength can be obtained from this simple process.

Moreover, as for this step, when using a flexible printed circuit board, it is more preferable that the flexible printed circuit board is attached to the mother substrate 100 by forming openings in advance in the region corresponding to each of the second holes 12 and aligning the openings with the second holes 12. It is needless to say that the region corresponding to each of the second holes 12 may be opened after having attached the flexible printed circuit board. Furthermore, as for the flexible printed circuit board of the embodiment, the one including a microstrip line, wherein the first wiring layer 14 is arranged on one surface side of a dielectric layer and the second wiring layer 16 is arranged on another surface side, is used. As for the first wiring layer 14 and the second wiring layer 16 included in the flexible printed circuit board, for example, the one with a thickness of around 12 μm, which is made of copper with a thickness of 10 μm and subsequently electroformed with nickel (Ni), gold (Au) or the like, is suitable.

In addition, before forming the translucent layer 15 or the like, it is also suitable to carry out a planarization processing of one surface side of the mother substrate 100. Moreover, the first wiring layer 14, the translucent layer 15, and the second wiring layer 16 may be formed separately. In this case, it is effective to form the first wiring layer 14 on the mother board at first, and then form the translucent layer 15 thereon, and further form the second wiring layer 16 on the translucent layer 15 using a method such as sputtering or copper foil attaching. In this case, the translucent layer 15 can be formed by attaching a layer such as a polyimide layer as the translucent layer.

Figure 2C:
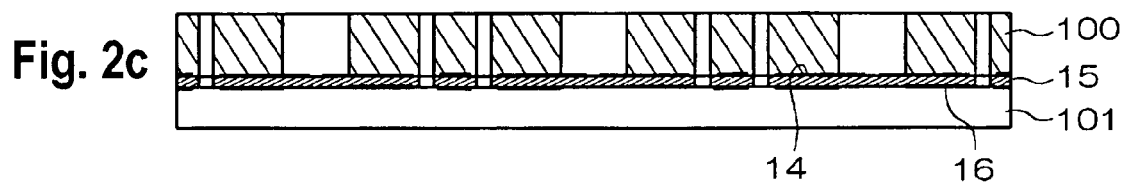

Next, as shown in FIG. 2(c), on the other surface side (the side where the second wiring layer 16 is arranged) of the translucent layer 15, a dummy substrate 101 is arranged as a jig. At least one surface side of the dummy substrate 101 is substantially flat, and the dummy substrate 101 has a function to support the translucent layer 15 from the back surface side when mounting the optical element 13 in the next step, and can be made of any material, but material such as metal or glass is suitably used. In the embodiment, a substrate of SUS (stainless steel) is used as the dummy substrate 101. Further preferably, the dummy substrate 101 is fixed to the mother substrate 100 by a method of screwing or the like. In addition, in this step, at least the other surface side of the translucent layer 15 should be supported by a flat surface, and the dummy substrate 101 does not necessarily need to be used. However, the optical element 13 is mounted more easily by using the dummy substrate 101.

Figure 2D:
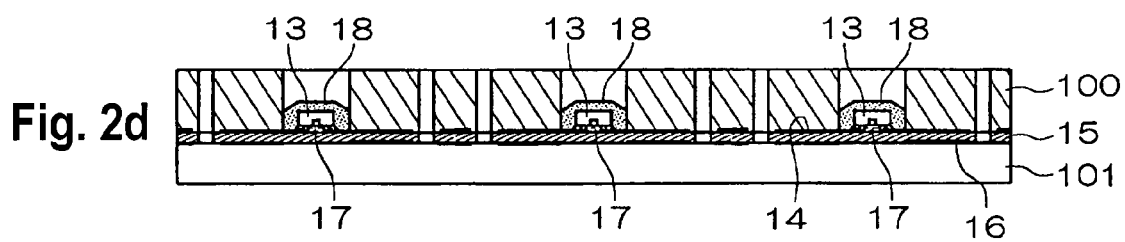

Next, as shown in FIG. 2(d), each optical element 13 is inserted inside each of the first holes 11, and mounted on the translucent layer 15 so that each light emitting surface of the optical element 13 is directed toward the translucent layer 15 side. In this step, the optical element 13 is bonded to the first wiring layer 14 by flip-chip bonding, for example. In this step, because the first hole 11 is made as a penetrating hole, the optical element 13 can be easily mounted from the opening, which is not covered with the translucent layer 15. Moreover, in this step, because the translucent layer 15 is supported from the bottom side by the above-described dummy substrate 101, the optical element 13 can be mounted securely on the translucent layer 15 while avoiding deformation or damage of the translucent layer 15 when mounting the optical element 13. In this step, each of the second holes 12 is used as an alignment mark, for example, and the optical element 13 is mounted by being aligned with these holes as reference.

As shown in FIG. 2(d), after having mounted the optical element 13, the underfill material 17 to reduce optical loss is filled between the optical elements 13 and the translucent layers 15. This step is carried out by infiltrating the underfill material 17, which consists of a transparent epoxy resin, between the optical element 13 (more specifically, the light emitting surface of the optical element 13) and the translucent layer 15, and by subsequent thermosetting.

Next, as shown in FIG. 2(d), the sealing material 18 is formed inside the first hole 11 and on the translucent layer 15 so as to seal the entire optical element 13. As for the sealing material 18, for example, a thermosetting epoxy resin can be used. The sealing material 18 and the above-described underfill material 17 may be made of a same material, and the manufacturing process will be simplified in such a case.

Figure 2E:
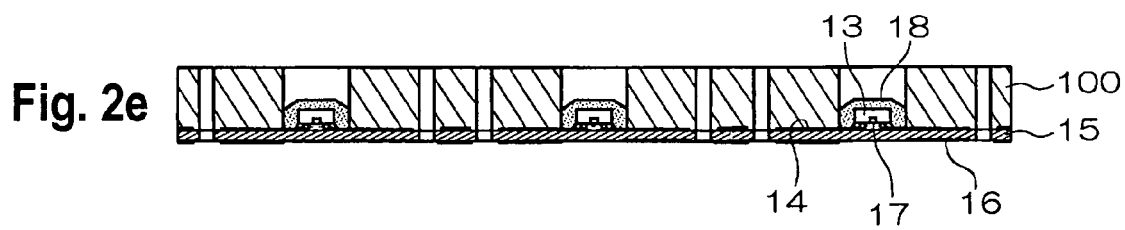
Figure 2F:
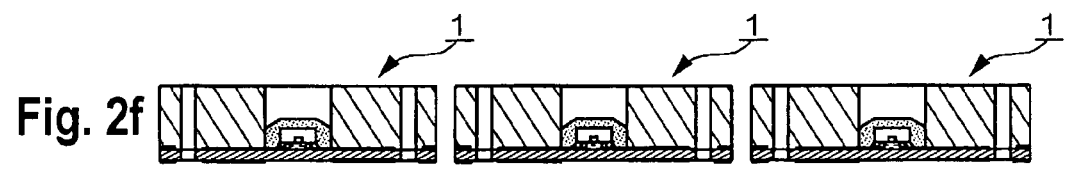

Next, as shown in FIG. 2(e), the dummy substrate 101 is removed from the mother substrate 100. Then, as shown in FIG. 2(f), the mother substrate 101 or the like are divided for each predetermined region corresponding to each of the plurality of optical modules 1, and then the plurality of optical modules 1 are obtained. The division in this step can be carried out by a method of dicing, laser cutting or the like.

Accordingly, because the optical module 1 according to the embodiment employs a structure where the optical element 13 is arranged in the space secured by the first hole 11 and supported by the translucent layer 15 that is arranged so as to cover the first hole 11, the mutual distance of the optical element 13 and the optical fiber 3 is not dependent on the thickness of the substrate 10. Accordingly, the optical coupling efficiency can be increased without being dependent on the thickness of the substrate 10. Moreover, because the translucent layer 15 is interposed between the optical element 13 and the optical fiber 3, the influence of open air, humidity or the like from the optical fiber 3 side is prevented, and the protection performance of the light emitting surface or the light receiving surface of the optical element 13 can be increased easily. Moreover, because most of the assembly steps of the optical module 1 can be batch processed on one substrate (the mother substrate 100), an inexpensive optical module with a good yield can be mass-produced.

The optical module 1 according to the embodiment is suitably used for an optical-communication apparatus (an optical transceiver). The optical-communication apparatus according to the invention can be used for a personal computer, PDA (personal digital assistant apparatus), an electronic notebook, and other various kinds of electronic apparatuses.

In the above-described first embodiment, the optical module, which does not include a drive circuit or the like for driving the optical element 13, has been described as an example, however, the optical module can be constituted including these.

Figure 3:
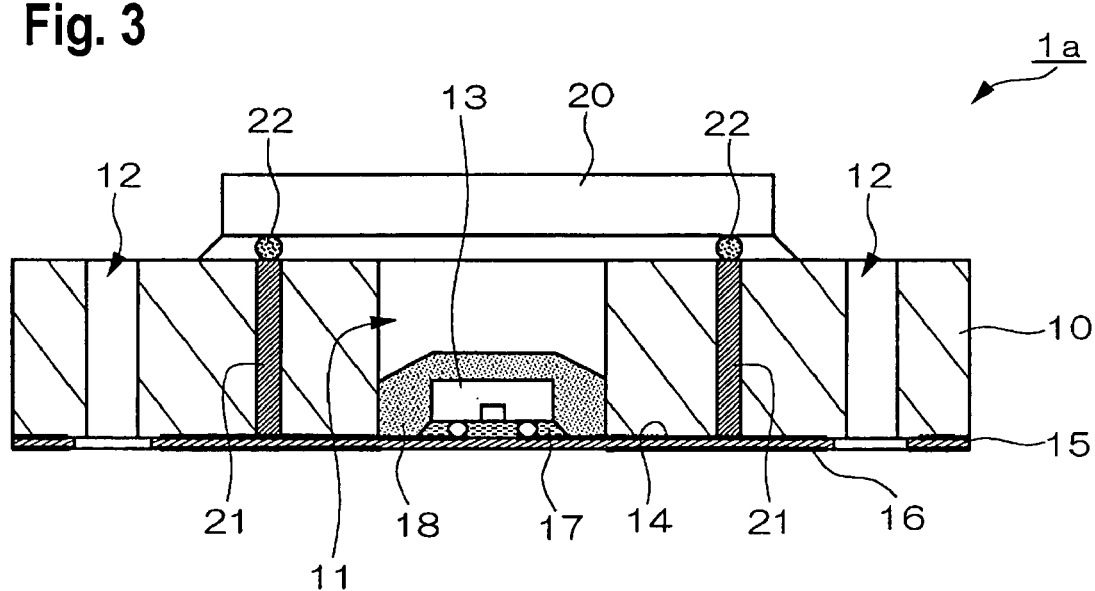
FIG. 3 is a view explaining a structure of an optical module according to a second embodiment.

FIG. 3 is a view explaining a structure of an optical module according to a second embodiment. The basic structure of the optical module 1a shown in this view is the same as that of the optical module 1 according to the above-described first embodiment, and further includes a circuit chip 20, which constitutes an electric circuit together with the optical element 13. Specifically, as for the circuit chip 20, a driver, which drives the light emitting element, or an amplifier, which amplifies the output current of the light receiving element, or the like can be cited. In addition, although the illustration is omitted, the optical module 1a may be constituted including passive elements such as a resistor and a capacitor, and various kinds of electronic components other than the circuit chip 20. Furthermore, a circuit pattern may be formed also on the other surface side (the side where the circuit chip 20 is arranged) of the substrate 10 by using a conduction layer.

The above-described circuit chip 20 is arranged on the top surface side (the other surface side) of the substrate, and is electrically coupled to the first wiring layer 14 through a conductor (plug) 21 that is formed so as to penetrate the substrate 10. More preferably, the circuit chip 20 is arranged above the optical element 13 so as to cover the first hole 11, where the optical element 13 is arranged as illustrated. By carrying out such three-dimensional packaging, the packaging area can be reduced and further miniaturization of the optical module 1a can be attained. Furthermore, according to the embodiment, a bump 22 consisting of a solder ball is arranged between the circuit chip 20 and the conductor 21. By using the bump 22, mounting of the circuit chip 20 becomes ease.

Next, a method of manufacturing the optical module 1a according to the embodiment will be described. The manufacturing method according to the embodiment is basically the same as that of the manufacturing method of the above-described first embodiment (refer to FIG. 2). Hereinafter, the difference will be mainly described.

First, in the step of forming the first hole 11 and the second hole 12 (refer to FIG. 2(a)), a third hole (through-hole) for embedding the conductor 21 is formed as well.

After the step of forming the first conduction layer 14, the translucent layer 15 and the second conduction layer 16 (refer to FIG. 2(b)), the conductor 21 is formed inside the above-described through-hole. The conductor 21 can be formed, for example, by pouring solder at high temperature into the through-hole. After having formed the conductor 21, a circuit pattern is formed on the other surface side (the side where the circuit chip 20 is arranged) of the mother board, as required.

After having carried out the mounting of the optical element 13 (refer to FIG. 2(d)), the circuit chip 20, having the bump 22 formed thereon, is aligned with the conductor 21 and mounted. The mounting is carried out by flip-chip bonding, for example.

By adding the above-described each step to the manufacturing method according to the first embodiment, the optical module 1a according to the embodiment can be manufactured. The optical module 1a according to the second embodiment, formed by this way, has the same operational effect as the optical module 1 according to the first embodiment. Furthermore, because the optical module 1a includes electronic components such as the circuit chip 20, an external drive circuit or the like can be omitted or simplified, and thus the optical module 1a is handled conveniently. Because the wire length between the circuit chip 20 and the optical element 13 is shortened, an effect that easily avoids inconvenience such as signal delay or noise interference can be also expected. The optical module 1a according to the embodiment can be also used for an optical transceiver or various kinds of electronic apparatuses.

Figure 4:
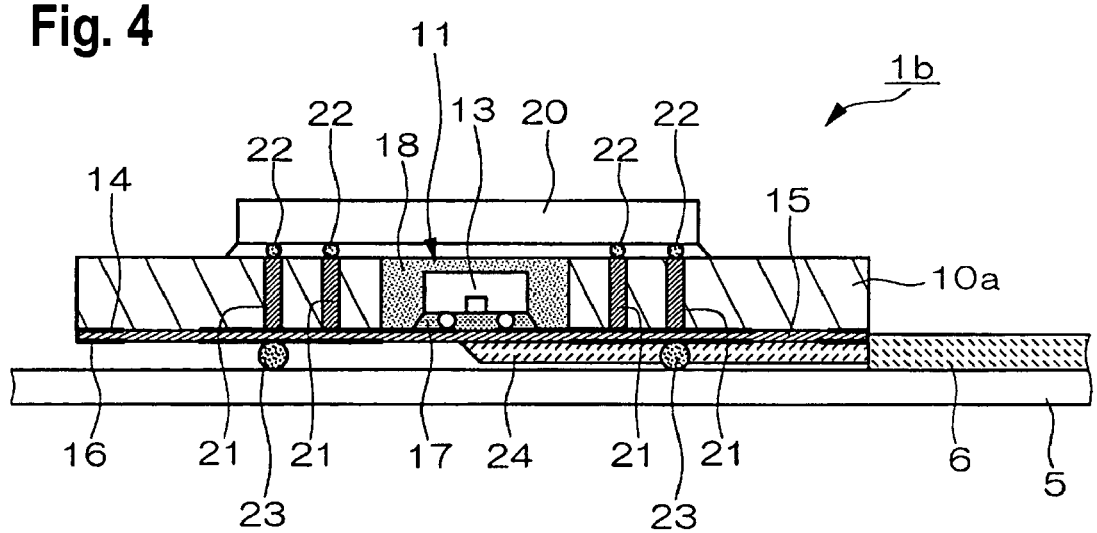
FIG. 4 is a view explaining a structure of an optical module according to a third embodiment.

FIG. 4 is a view explaining a structure of an optical module according to a third embodiment. An optical module 1b according to the embodiment is not the one that is detachable to the connector supporting the optical fiber described in each of the above embodiments, but the one that is used as being mounted on a circuit board 5 (an opto/electric mixed substrate) including an optical waveguide 6, as illustrated.

The optical module 1b shown in this view is basically provided with the same structure as the optical module 1a according to the above-described second embodiment, however, the optical module 1b differs, in that the second hole used for the alignment of the connector is omitted and that an optical waveguide 24 is added. The same numerals are given to the common components, and thus the description thereof will be omitted.

The optical waveguide 24 is coupled to the optical waveguide 6 provided on the circuit board 5, and has a function to transmit the light signal radiated from the optical element 13 or the light signal sent form the outside. At the coupling point of the optical waveguide 24 and the optical waveguide 6 on the circuit board 5 side, a matching oil or the like, which properly reduces optical loss, is used. The optical module 24 is arranged such that the extension direction thereof is substantially in parallel with one surface side of a substrate 10a. Then, a reflective mirror is formed at the end of the optical waveguide 24, and the course of the light signal radiated from the optical element 13 is changed by substantially 90 degrees by the reflective mirror, and thus the light signal proceeds through the optical waveguide 24. Moreover, the course of the light signal sent through the optical waveguide 24 is changed by substantially 90 degrees by the reflective mirror, and the light signal is incident on the optical element 13.

The circuit board 5 includes the optical waveguide 6, which has a function to transmit light signal, and further includes a circuit chip, a wiring layer or the like (not shown), which has a function to transmit electrical signal, as required. Electrical coupling between the circuit board 5 and the optical module 1b is attained by a bump 23. The optical module 1b according to the embodiment, and the circuit board 5, where the optical module 1b is mounted, can be applied to various kinds of electronic apparatuses such as a personal computer, and can be used for information communication between boards or between chips in an apparatus, and information communication to/from an external apparatus or the like.

In addition, the manufacturing process of the optical module 1b is essentially the same as that of the optical module 1a according to the second embodiment, and thus only a step of forming the optical waveguide 24 on the other surface of the translucent layer 15 is further added. Moreover, the optical waveguide 24 can be included on the circuit board 5 side, not on the optical module 1b side.

As described above, various kinds of embodiments of the optical module according to the invention have been described, however, it should be understood that the scope of the invention is not limited to the above-described embodiments, but various kinds of modified implementation is possible within the scope of the present invention. For example, in each of the above-described embodiments, the optical module can be used for parallel transmission by using the one including a plurality of light sources (for example, a VCSEL array) or the one including a plurality of light receiving elements (for example, a photodiode array) as the optical element, and by using a multi-channel (a multi-core) tape fiber as the optical fiber.

What is claimed is:

1. An optical module, detachably coupled to a connector provided at one end side of an optical fiber, comprising:
   a substrate having a first hole;
   a translucent layer that is arranged so as to cover at least the first hole on one surface side of the substrate; and
   an optical element that is arranged inside the first hole and on the translucent layer and that carries out transmission or reception of light signal to/from the optical fiber through the translucent layer.

2. The optical module according to claim 1, the first hole being formed so as to penetrate the substrate.

3. The optical module according to claim 1, the substrate further including a second hole used for aligning the connector.

4. The optical module according to claim 1, further comprising adjustment material that is interposed between the translucent layer and the optical elements and that suppresses scattering of the light signal.

5. The optical module according to claim 4, further comprising sealing material that seals the optical element.

6. The optical module according to claim 5, the sealing material and the adjustment material being made of a same material.

7. The optical module according to claim 1, the translucent layer being formed of a translucent flexible printed circuit board having a wiring layer at least on one surface side.

8. The optical module according to claim 7, the flexible printed circuit board including a microstrip line.

9. The optical module according to claim 7, further comprising an electronic component that is arranged on another surface side of the substrate and constitutes an electric circuit together with the optical element.

10. The optical module according to the claim 9, the electronic component being electrically coupled to the wiring layer of the flexible printed circuit board through a conductor that is arranged and that penetrates the substrate.

11. The optical module according to claim 9, the electronic component being arranged above the optical element.

12. An optical module, comprising:
   a substrate having a hole;
   a translucent layer, that is arranged on one surface side of the substrate so as to cover at least the hole;

an optical element, that is arranged inside the hole and on the translucent layer and that carries out transmission or reception of light signal through the translucent layer; and an optical waveguide, that is arranged on one surface side of the substrate and that allows light signal, which is to be sent or received by the optical element, to pass through the optical waveguide.

13. The optical module according to the claim 12, the optical waveguide being arranged such that an extension direction of the optical waveguide is approximately in parallel with one surface side of the substrate.

14. The optical module according to the claim 12, the translucent layer being constituted of a flexible translucent printed circuit board having wiring layer at least on one surface side, and the optical module further having a bump, which is arranged on another surface side of the substrate of the flexible printed circuit board and has a function of electrical coupling to the outside.

15. An optical communication apparatus, comprising the optical module according to claim 1.

16. An electronic apparatus, comprising the optical module according to claim 1.

17. A method of manufacturing an optical module, comprising:
forming a hole on a substrate;
forming a translucent layer on one surface side of the substrate so as to cover at least the hole; and
forming an optical element which carries out transmission or reception of light signal inside the hole and on the translucent layer.

18. A method of manufacturing an optical module, comprising:
forming a plurality of first holes in a substrate;
forming a translucent layer on one surface side of the substrate so as to cover at least each of the first holes;
forming an optical element which carries out transmission or reception of light signal inside each of the holes and on the translucent layer; and
dividing the substrate for each predetermined region corresponding to each of the first holes.

19. The method of manufacturing the optical module according to the claim 18, further comprising forming a wiring layer, which has a function to transmit signal to each of the optical elements at least on one surface side of the translucent layer.

20. The method of manufacturing the optical module according to the claim 19, the forming the translucent layer and forming the wiring layer being simultaneously carried out by attaching a flexible printed circuit board having the translucent layer and a wiring layer to one surface side of the substrate.

21. The method of manufacturing the optical module according to claim 18, further comprising forming an adjustment material, which suppresses scattering of the light signal, between the translucent layer and the optical element.

22. The method of manufacturing the optical module according to claim 18, further comprising forming a sealing material so as to cover each of the optical elements.

23. The method of manufacturing the optical module according to claim 18, further comprising forming a second hole, which is used for the alignment when arranging a connector provided at one end side of an optical fiber on one surface side of the substrate.

24. The method of manufacturing the optical module according to claim 18, further comprising forming an electronic component, which constitutes an electric circuit together with the optical element, by corresponding the electronic component to each of the optical elements, on the other surface side of the substrate.

25. An optical communication apparatus, comprising the optical module according to claim 12.

26. An electronic apparatus, comprising the optical module according to claim 12.

* * * * *